(12) United States Patent
Purser

(10) Patent No.: US 7,051,912 B2
(45) Date of Patent: May 30, 2006

(54) BREAKING APPARATUS

(76) Inventor: Brian Purser, Tickhill Farm Caverswall Common, Stoke-on-Trent (GB) ST11 9EX ( * ) Notice: Subject to any disclaimer, the term of this patent is extended or adjusted under 35 U.S.C. 154(b) by 34 days.

(21) Appl. No.: 10/362,143

(22) PCT Filed: May 13, 2002

(86) PCT No.: PCT/GB02/02213

§ 371 (c)(1),
(2), (4) Date: Jul. 16, 2003

(87) PCT Pub. No.: WO02/092069

PCT Pub. Date: Nov. 21, 2002

(65) Prior Publication Data

US 2004/0094009 A1 May 20, 2004

(30) Foreign Application Priority Data

May 11, 2001 (GB) .................... 0111519
Apr. 12, 2002 (GB) .................... 0208397

(51) Int. Cl.
B26F 3/00 (2006.01)

(52) U.S. Cl. ............... 225/103; 83/928; 83/DIG. 2; 241/198.1; 241/264

(58) Field of Classification Search ............ 83/928, 83/607, DIG. 2; 30/134; 241/198.1, 264, 241/269; 725/96.5, 103
See application file for complete search history.

(56) References Cited

U.S. PATENT DOCUMENTS 3,846,908 A 11/1974 Allievi
4,512,524 A * 4/1985 Shigemizu ............ 225/103
4,669,187 A * 6/1987 Pardoe ............ 30/134
4,720,032 A * 1/1988 LaBounty ............ 225/96.5
4,776,093 A 10/1988 Gross
4,838,493 A * 6/1989 LaBounty ............ 225/103
5,230,151 A * 7/1993 Kunzman et al. ............ 30/134
5,284,283 A * 2/1994 LaBounty et al. ............ 225/96.5
5,384,962 A * 1/1995 Pemberton ............ 30/134
5,471,747 A * 12/1995 Morikawa et al. ............ 83/928
5,671,892 A * 9/1997 Morikawa et al. ............ 30/134
6,119,970 A 9/2000 LaBounty et al.
6,298,560 B1 * 10/2001 Lee ............ 30/134
6,892,918 B1 * 5/2005 Purser ............ 225/103
2002/0162435 A1 * 11/2002 Purser ............ 83/928
2005/0145084 A1 * 7/2005 Purser ............ 83/607

* cited by examiner

Primary Examiner—Allan N Shoap
Assistant Examiner—Jason Prone
(74) Attorney, Agent, or Firm—Adams Evans P.A.

(57) ABSTRACT

Article breaking apparatus for mounting on an arm of a suitable vehicle, the apparatus having a pair of hydraulically operated jaws (12, 24), the first jaw (12) of the pair having first and second mutually perpendicular article supporting surfaces (14, 16) and the second jaw having an article engaging surface (26). The jaws (12, 14) are movable about a first pivot axis (22) between an article receiving position in which the first article supporting surface (14) and the article engaging surface (26) diverge away from the first pivot axis (22) and an article breaking position in which said surfaces (14, 26) diverge towards the first pivot axis (22). When an article (82) is located between the jaws (12, 24) and the jaws (12, 24) move from the receiving to the breaking position, the article (82) will be urged towards the second article supporting surface (16) and held there against until broken by the relative movement of the said surfaces (14, 26).

26 Claims, 5 Drawing Sheets

BREAKING APPARATUS

TECHNICAL FIELD AND BACKGROUND OF THE INVENTION

The present invention relates to breaking apparatus, and particularly but not exclusively apparatus for breaking railway rails.

In use apparatus according to the invention is mounted on an hydraulically-powered arm of a suitable vehicle. The term "suitable vehicle" as used herein means a vehicle having an arm of one or more articulated portions, said arm being powered wholly or partially by hydraulic power. Examples of suitable vehicles include excavating vehicles having wheels or being track laying and having an arm of one or more articulated portions, said arm being powered wholly or partially by hydraulic power and usually having mounted at an extremity of the arm a bucket for earth excavation or some other tool, for example a pneumatic or hydraulic percussion device or means for manipulating objects such as telegraph poles, posts and the like. Another example of a suitable vehicle may include a railway maintenance wagon having flanged wheels and running on the railway track, and having a similar articulated arm powered by hydraulic power.

It is known to provide an arm on an excavating vehicle having a scrap shear provided thereon, the scrap shear apparatus being adapted to shear or cut a wide range of tough materials of differing properties and of differing sizes. The breaking up of steel rails as used in railways presents particular problems. The rails are of regular, and relatively small, cross-section and the breaking of such rails in a general purpose scrap shear apparatus is relatively slow and inefficient. Further, the rails are brittle, and have a tendency to shatter or splinter in a shear attachment. The rails must be positioned for or fed into the shear apparatus which is a time consuming and potentially hazardous activity.

The present invention is particularly, but not exclusively, directed towards the breaking of rails as used on railway lines, the rails having substantially an I-beam cross-section, and including a wearing flange and a base flange interconnected by a web. The wearing flange, being the flange on which the carriage wheels run, has a thinner width and a thicker depth than the base flange, which is seated on the ground. Such rails are made to standardised dimensions of a hard material and are relatively brittle, with a tendency to shatter and splinter when broken. Such rails will be referred to as rails of the aforesaid type.

SUMMARY OF THE INVENTION

According to the present invention there is provided article breaking apparatus, the apparatus including: a first member having a first jaw on an end thereof, the first jaw having a first article supporting surface, the first member including a first pivot means, a second member pivotally mounted on the first pivot means about a first pivot axis and having a second jaw cooperable with the first jaw, the second jaw having an article engaging surface; the first and second jaws being movable relative to each other between an article receiving position in which the first article supporting surface and the article engaging surface diverge away from the first pivot axis, and an article breaking position in which said surfaces diverge towards the first pivot axis, whereby, as the jaws move from the receiving position to the breaking position, an article located between the jaws will be urged along the first article supporting surface towards the first pivot axis by the movement of the second jaw against the article relative to the first jaw, said apparatus further including means for moving said jaws between the receiving and breaking positions.

Further according to the present invention, there is provided article breaking apparatus mountable on the arm of a suitable vehicle, the apparatus being as described in the preceding paragraph, the first member including a fixing means remote from the first jaw permitting mounting of the apparatus on the vehicle arm.

The moving means preferably comprises a piston and cylinder assembly mounted on one of said first and second members.

The piston and cylinder assembly is preferably hydraulically driven and may be driven by an hydraulic compressor of the vehicle to which the apparatus is attached in use.

Preferably the first jaw includes a second article supporting surface inclined relative to the first article supporting surface and closer to the first pivot axis, whereby, as the jaws move from the article receiving to the article breaking position, an article located between the jaws will be urged towards the second article supporting surface and held thereagainst until broken by relative urging together of the first and second article supporting surfaces and the article engaging surface.

Preferably the first article supporting surface is arranged to support an article with its longitudinal axis transverse to the jaws and at an oblique angle relative to the direction of motion of the jaws. Preferably the angle is between 45° and 75°, more preferably between 56° and 66°, and is desirably 61°.

Preferably the first article supporting surface includes a first article engaging edge and a second article engaging edge spaced from the first article engaging edge, the said edges engageable with the article to be broken.

Preferably the first edge is nearer than the second edge to the article engaging surface of the second jaw in the direction of motion of the jaws, and may be nearer to said surface than the second edge in a direction lateral to the direction of motion of the jaws. Preferably the first edge is cooperable with the article engaging surface of the second jaw. Preferably the plane of motion of the article engaging surface lies between the said edges.

Preferably the article engaging surface includes a blade. Preferably the blade is removable.

Preferably the cylinder of the piston and cylinder assembly is pivotally mounted on the first member, and the piston is pivotally connected at its end about a second pivot axis to the second member. Preferably the piston is connected to a slot or slots in the second member, and the end of the piston may include a pin extending through and slidably mounted in the slot or slots.

Preferably the apparatus is arranged such that initially the pin moves towards the first pivot axis, and subsequently away from said axis, as the jaws move respectively from the receiving position to the article breaking position. Preferably the longitudinal axis of the or each slot extends substantially towards the first pivot axis.

The fixing means may include second pivot means for pivoting the apparatus about a third pivot axis relative to a vehicle. The third pivot axis may extend substantially through the first pivot axis, and may be perpendicular thereto. The third pivot axis may further extend between the jaws in the receiving position. An actuating means may be provided to pivot the apparatus about the third pivot axis, and said actuating means may comprise a rotary actuator.

Preferably the first pivot means includes a thrust bearing, and may include a pad which may be adjustable.

The invention also provides apparatus for breaking rails of the aforesaid type, the apparatus being according to any of the preceding twelve paragraphs.

The length of the jaws is preferably less than the height of the rail being broken so that the article engaging surface engages only a side of the wearing flange of the rail when the jaws move from the receiving to the breaking position.

Forward of the jaws, the first and second members preferably include surfaces inclined at substantially 90° or less to the jaws, so that the apparatus may be used to break rails which may be lying on the ground.

According to the present invention there is further provided a suitable vehicle as hereinbefore defined, the vehicle being fitted with article breaking apparatus according to any of the preceding fifteen paragraphs.

Further according to the present invention, there is provided a method of breaking rails of the aforesaid type, the method including bringing an apparatus as set out above fitted to a suitable vehicle into the vicinity of a rail of the aforesaid type to be broken, orientating the apparatus with respect to the rail of the aforesaid type so that the wearing flange is between the jaws, and operating the moving means to move the jaws from the receiving position to the breaking position to break the rail.

BRIEF DESCRIPTION OF THE DRAWINGS

An embodiment of the present invention will now be described by way of example only, with reference to the accompanying drawings, in which.

DESCRIPTION OF THE PREFERRED EMBODIMENT AND BEST MODE

Figure 1:
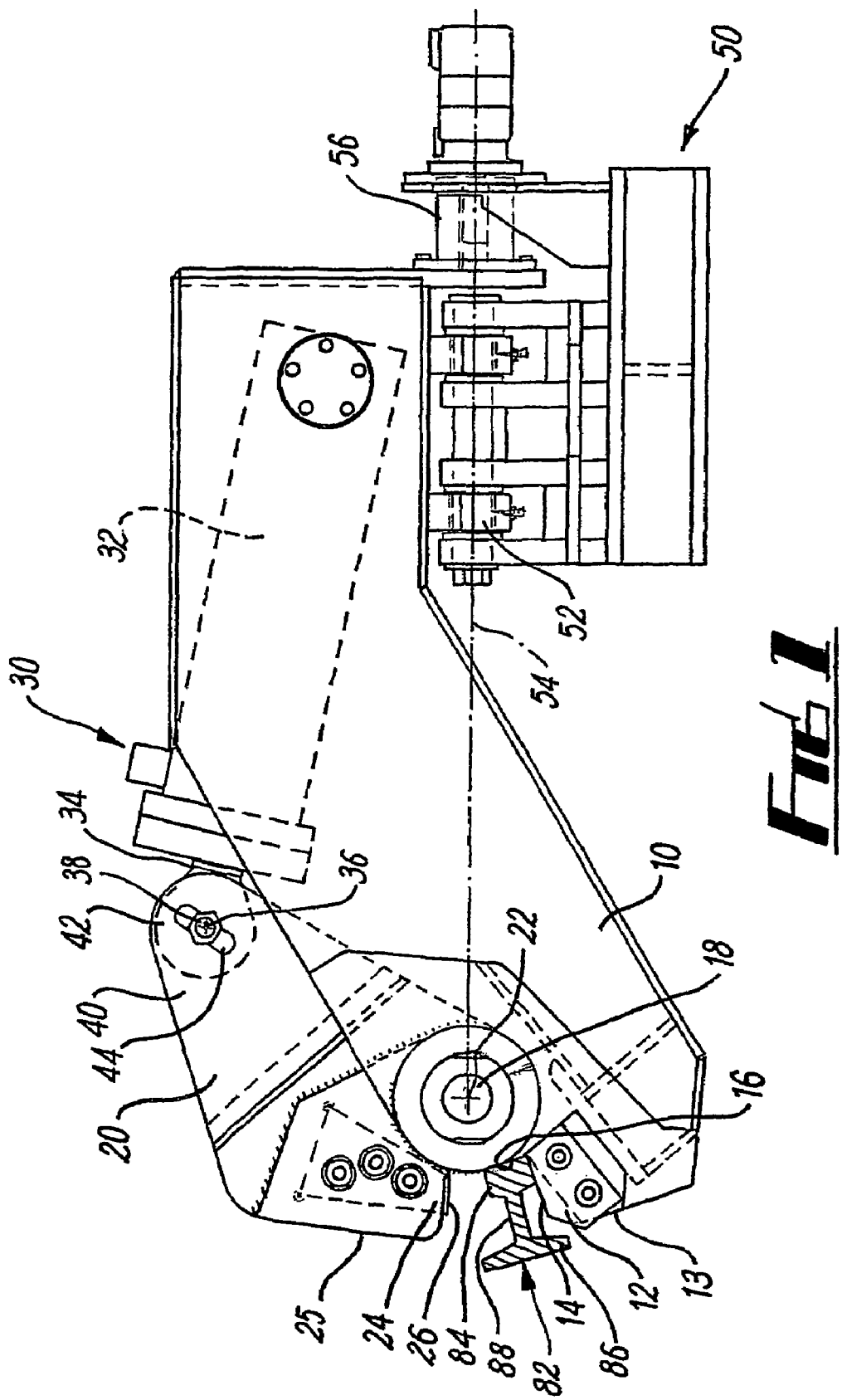
FIG. 1 shows a side view of an article breaking apparatus with its jaws in an article receiving position.
Figure 2:
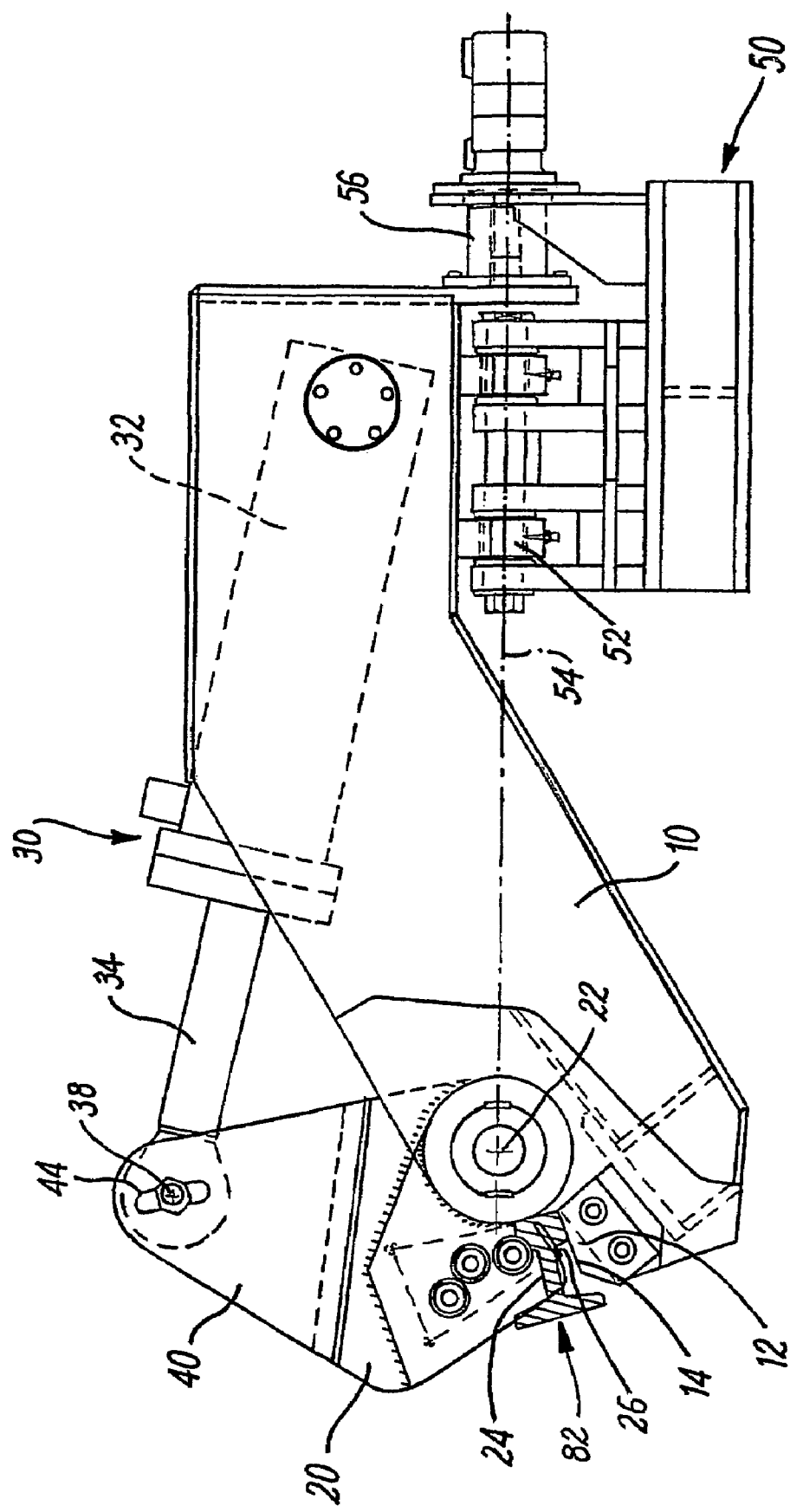
FIG. 2 is a view similar to FIG. 1 with the jaws in an article breaking position.
Figure 3:
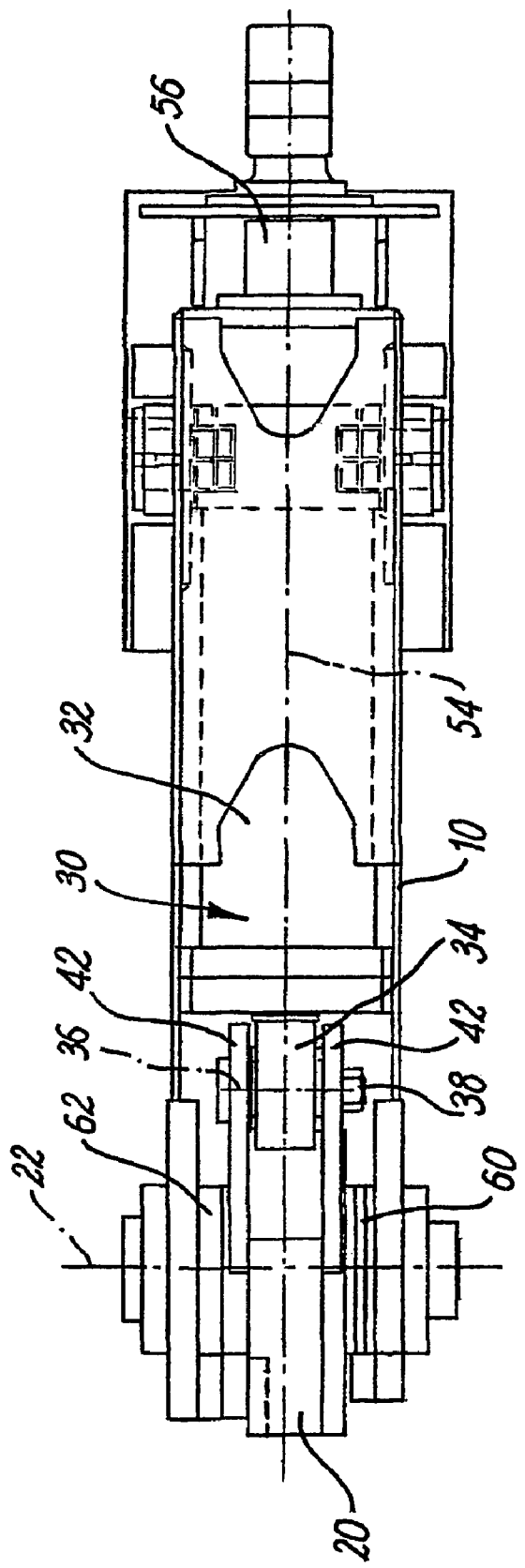
FIG. 3 is a plan view of the apparatus shown in FIG. 1.

FIGS. 1 and 2 show an article breaking apparatus including a first member 10 having a first jaw 12. The first jaw 12 includes first and second generally mutually perpendicular article supporting surfaces 14, 16. First member 10 includes a first pivot means 18. A second member 20 is pivotally mounted on first pivot means 18 about a first pivot axis 22. The second member 20 includes a second jaw 24 having an article engaging surface in the form of a removable blade 26. The blade is removable to allow replacement when worn or damaged.

First and second jaws 12, 24 are movable relative to each other between an article receiving position and an article breaking position. In the receiving position, the first article supporting surface 14 and the blade 26 diverge away from the first pivot axis 22, and in the breaking position said surface 14 and said blade 26 diverge towards the first pivot axis 22.

Forward to the jaws 12, 24, the surfaces 13, 25 of the first and second members 10, 20 extend substantially perpendicularly to the jaws 12, 24 downwardly and upwardly respectively.

First pivot means 18 may include a thrust bearing 60 and an adjusting pad 62 to accommodate any forces directed along the pivot axis 22 during the breaking operation.

The apparatus includes a means for moving the jaws between the receiving and breaking positions, the means including a piston and cylinder assembly 30, the cylinder 32 being pivotally mounted on the first member 10. The second member 20 includes a yoke 40 having two arms 42, each arm having an aligned straight slot 44. The free end of the piston 34 of the piston and cylinder assembly 30 includes a pin 38, extending through the slots 44 and slidably mounted therein, thus pivotally connecting the piston 34 to the second member 20 and forming a second pivot axis 36. The longitudinal axes of the slots 44 extend substantially towards the first pivot axis 22.

The first member 10 includes a fixing means 50 for mounting the apparatus on the vehicle arm. The fixing means 50 includes a second pivot means 52 for pivoting the apparatus about a third pivot axis 54. The third pivot axis 54 extends through the first pivot axis 22 and is perpendicular thereto, and extends between the jaws 12, 24 when in the receiving position. The fixing means 50 includes a rotary actuator 56, operable to cause pivoting of the apparatus about the pivot axis 54. The rotary actuator 56 may be electrically powered.

Figure 4:
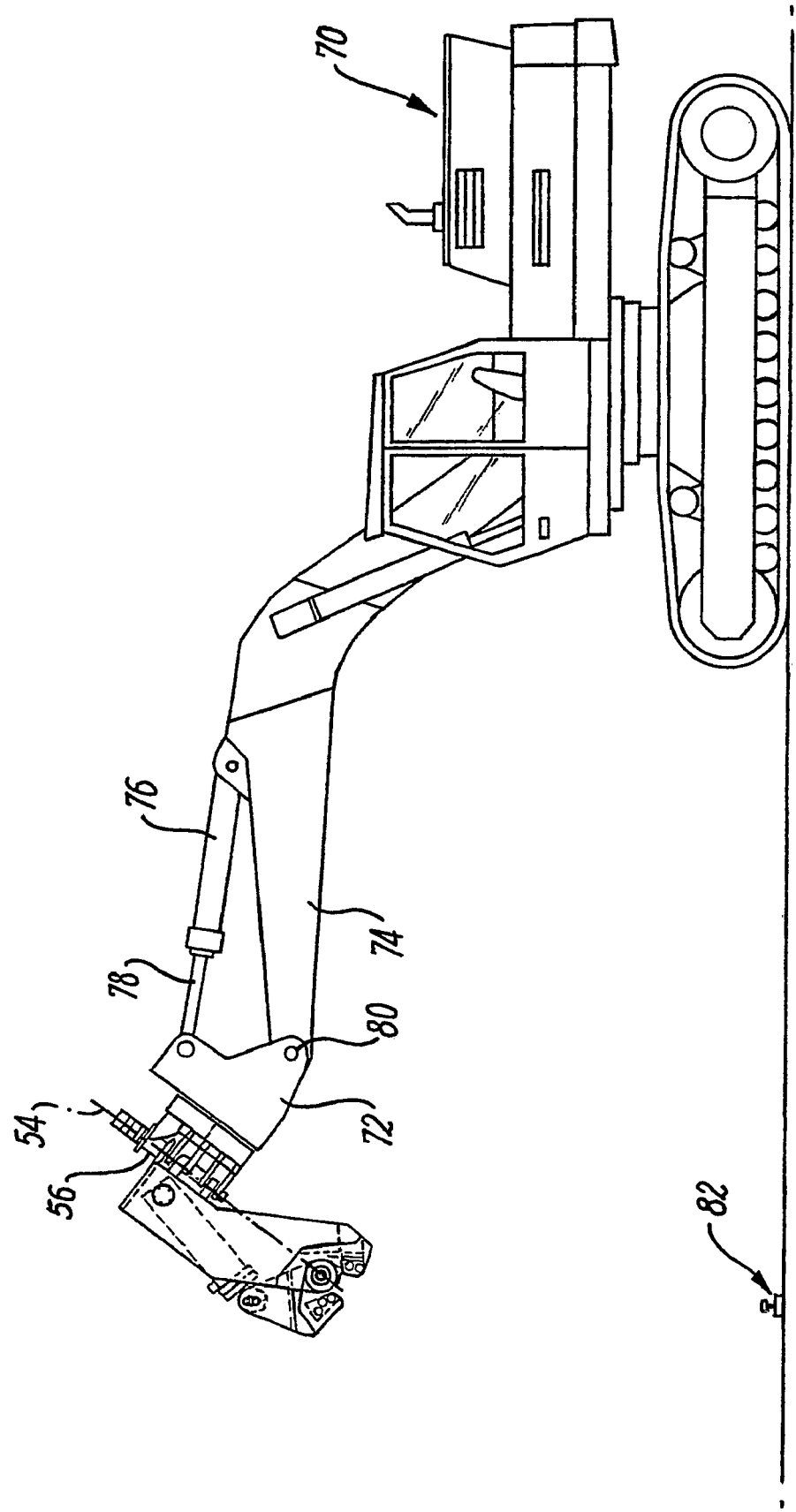
FIG. 4 is a diagrammatic side view on a reduced scale of a suitable vehicle fitted with the article breaking apparatus of FIG. 1.

FIG. 4 shows the apparatus mounted on a mounting means 72 on a vehicle 70. The mounting means 72 is pivotally mounted about a fourth pivot axis 80 on the vehicle arm 74. The cylinder 76 of an hydraulic piston and cylinder assembly is pivotally mounted on the arm 74, with the piston 78 being pivotally connected to the mounting means 72, and operable to pivot the apparatus about the fourth pivot axis 80. The arm 74 may be lowered and raised.

In use, the apparatus is mounted by means of the fixing means 50 on the arm 74 of a suitable vehicle as shown in FIG. 4. Mounted as shown, the apparatus may be raised and lowered with the arm 74, tilted relative to the arm 74 by pivoting around pivot axis 80, and the apparatus pivoted about the third pivot axis 54 relative to the mounting means 72 by the rotary actuator 56. It will be realised that this freedom of movement allows the apparatus to be easily and conveniently engagable with an article such as a rail 82 which may be on the ground.

The substantial alignment of the third pivot axis 54 with the first pivot axis 22 and the jaws 12, 24 in the receiving position aids the operator since as the apparatus pivots about the third pivot axis 54 the space between the jaws 12, 24 substantially remains in the same position, allowing easy alignment of the jaws 12, 24 with the rail 82. Also, the apparatus is substantially balanced about the third pivot axis 54, making pivoting easier.

FIG. 1 shows the jaws 12, 24 of the apparatus in the article receiving position, and a rail 82 located between the jaws 12, 24. In comparison with the standard rail section, the length of the jaws 12, 24 is less than the height of the rail section, allowing only a portion of the rail between the jaws 12, 24. The rail 82 includes a wearing flange 84 and a base flange 86 interconnected by a web 88.

In a typical situation the rail 82 may be on the ground with the wearing flange 84 uppermost. The importance of the length of the jaws 12, 24 relative to the rail height, and the orientation of the surfaces 13, 25 extending perpendicularly to the jaws 14, 24 will now become apparent, since these features allow the apparatus to be positioned over the rail 82 on the ground and the apparatus operated so that the rail 82 is broken on the ground, without requiring lifting or feeding of the rail 82 into the apparatus.

The breaking operation is as follows. FIG. 1 shows the apparatus in the receiving position, with the first article supporting surface 14 and the blade 26 diverging away from the first pivot axis. A rail 82 is located between the jaws 12, 24, the wearing flange 84 towards the first pivot axis 22 and the second article supporting surface 16.

The hydraulic cylinder and piston assembly 34 is actuated and the piston 34 extends, the pin 38 sliding down the slots 44 towards the first pivot axis 22. At the bottom of the slots 44, the piston 34 continues to extend, pivoting the second member 20 about the first pivot axis 22, and moving the jaws 12, 24 from the receiving position to the breaking position. As the jaws 12, 24 close, the blade 26 and the first article supporting surface 14 change from diverging away from the first pivot axis 22 to diverging towards the first pivot axis 22 as shown in FIG. 2, urging the rail 82 inwards towards the second supporting surface 16 and the first pivot axis 22. As resistance to the movement of the jaws is encountered, the pin 38 moves upwards in the slots 44 away from the first pivot axis 22, allowing a greater leverage to be applied.

A position is reached in which the wearing flange 84 is in contact with the blade 26 and the first and second article supporting surfaces 14, 16. It will be noticed from FIG. 1 that the blade 26 only contacts the upper side of the wearing flange 84. Although the blade 26 is only acting upon the wearing flange 84, because of the brittleness of the material of the rail, further movement of the blade 26 cracks and breaks the rail 82.

Following breaking of the rail 82, the pin 38 moves down the slots 44 towards the first pivot axis 22, the hydraulic piston and cylinder assembly is actuated to retract the piston 34, and the jaws 12, 24 are moved back from the breaking to the receiving position. The movement of the pin 38 in the slots 44 allows quicker movement of the jaws 12, 24 between the receiving and the breaking positions than would be the case with a fixed pivot connection, and maximises the leverage available at the breaking position.

There is thus disclosed apparatus allowing the rapid and easy breaking of rails on the ground without the need for positioning or feeding of the rails to the apparatus. Such apparatus may be operated alongside rail tracks and may be mounted on railway trucks or carriages, or on other vehicles operating alongside the rail track. Although the apparatus has been described specifically with reference to rails, it will be realised that it may be used to break any suitable article manufactured from relatively brittle materials such as cast iron or hardened steel. It will also be realised that the apparatus may be used with the apparatus stationary and articles to be broken brought to the apparatus and fed into the jaws for breaking.

Various modifications may be made without departing from the scope of the invention. For example, the size of the jaws may vary to suit different types and sizes of rail. Different means of moving the jaws and/or of pivoting the apparatus about the third pivot axis may be utilised. The apparatus may be mounted on a ground engaging means such as a fixed base, a crane or other support or to an articulated arm mounted on such a support.

Figure 5:
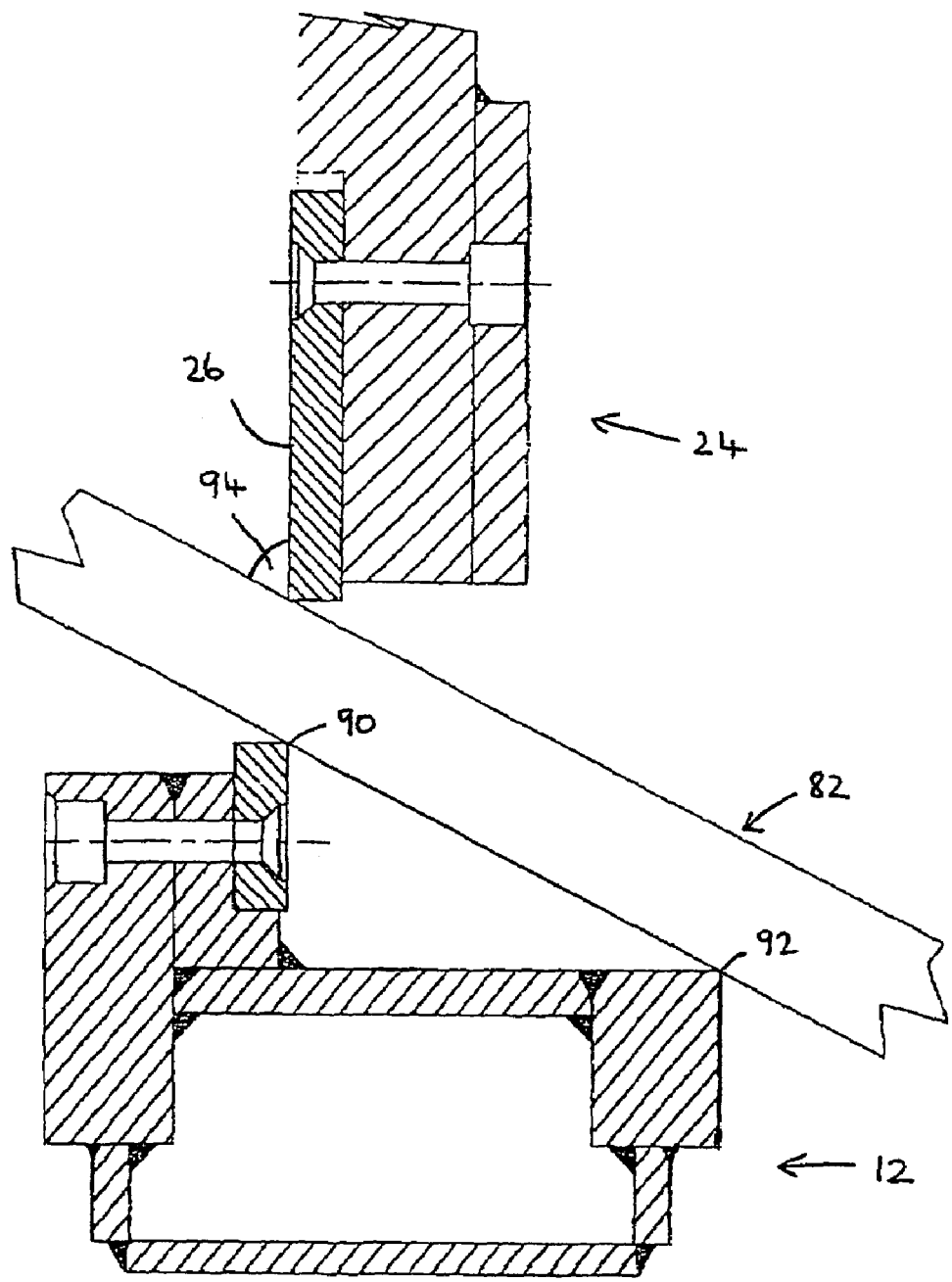
FIG. 5 shows a front sectional view of a detail of a modification of the jaws with an article between the jaws.

FIG. 5 shows a modification of the jaws. Second jaw 24 includes a removable blade 26 as described previously. First jaw 12 includes a first article supporting surface including first article engaging edge 90 and second article engaging edge 92, the second edge 92 being spaced from the first edge 90. First edge 90 is cooperable with blade 26, the plane of motion of blade 26 lying between the edges 90, 92. The second edge 92 is further away from the blade 26 than the first edge 90 in the direction of motion of the blade 26 and also laterally from the said direction of motion. First edge 90 may be formed by a removable blade.

FIG. 5 shows an article in the form of a rail 82 positioned between the jaws 12, 24 for breaking. As the jaws 12, 24 move from the article receiving to the article breaking position, the edges 90, 92 and the blade 26 engage the rail 82. In the situation where the rail 82 is on the ground or may not be easily movable for any reason, the apparatus is allowed to pivot about the third pivot axis 54 so that the edges 90, 92 and blade 26 are aligned against the rail as shown in FIG. 5. The different spacing of the edges 90, 92 from the blade 26 aligns the rail at an oblique angle 94 relative to the direction of motion of the blade 26. It has been found that the described configuration of edges 90, 92 and blade 26 considerably reduces the power required to break a rail. Benefits in power reduction are noticeable if the angle 94 has a value between 45° and 75°, more noticeable between 56° and 66° and are optimised at 61°.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. Article breaking apparatus, the apparatus including: a first member having a first jaw on an end thereof, the first jaw having a first article supporting surface, the first member including a first pivot means and a fixing means remote from the first jaw for permitting mounting of the apparatus on a vehicle arm, a second member pivotally mounted on the first pivot means about a first pivot axis and having a second jaw cooperable with the first jaw, the second jaw having an article engaging surface and being movable about the first pivot axis relative to the first jaw in an article receiving position in which the first article supporting surface and the article engaging surface diverge away from the first pivot axis, and an article breaking position in which said surfaces diverge towards the first pivot axis, whereby, as the second jaw moves from the receiving position to the breaking position, an article located between the jaws will be urged along the first article supporting surface towards the first pivot axis by the movement of the second jaw against the article relative to the first jaw, said apparatus further including means for moving said jaws between the receiving and breaking positions, the means for moving comprising a piston and cylinder assembly mounted on said first member, the piston and cylinder assembly is driven by a hydraulic compressor of the vehicle to which the apparatus is attached in use, the cylinder of the piston and cylinder assembly is pivotally mounted on the first member, and the piston is pivotally connected at its end about a second pivot axis to a slot or slots in the second member, the end of the piston includes a pin extending through and slidably mounted in the slot or slots such that initially the pin moves towards the first pivot axis, and subsequently away from said axis, as the jaws move respectively from the receiving position to the article breaking position.

2. Article breaking apparatus according to claim 1, in which the longitudinal axis of the or each slot extends substantially towards the first pivot axis.

3. Article breaking apparatus according to claim 1, in which the first jaw includes a second article supporting surface inclined relative to the first article supporting surface and closer to the first pivot axis, whereby, as the jaws move from the article receiving to the article breaking position, an article located between the jaws will be urged towards the second article supporting surface and held thereagainst until broken by relative urging together of the first and second article supporting surfaces and the article engaging surface.

4. Article breaking apparatus according to claim 1, in which the article engaging surface of the second jaw includes a blade.

5. Article breaking apparatus according to claim 4, in which the blade is removable.

6. Apparatus according to claim 1, in which the length of the jaws is less than the height of the rail being broken so that the article engaging surface engages only a side of the wearing flange of the rail when the jaws move from the receiving to the breaking position.

7. Apparatus according to claim 6, in which forward of the jaws, tile first and second members include surfaces inclined at substantially 90° or less to the jaws, so that the apparatus may be used to break rails lying on the ground.

8. Article breaking apparatus according to claim 1, in which the first pivot means includes a thrust bearing.

9. Article breaking apparatus according to claim 8, in which the first pivot means includes a pad.

10. Article breaking apparatus according to claim 9, in which the pad is adjustable.

11. Article breaking apparatus according to claim 1, in which the fixing means includes second pivot means for pivoting the apparatus about a third pivot axis relative to a vehicle.

12. Article breaking apparatus according to claim 11, in which the third pivot axis further extends between the jaws in the receiving position.

13. Article breaking apparatus according to claim 11, in which the third pivot axis extends substantially through the first pivot axis.

14. Article breaking apparatus according to claim 13, in which the third pivot axis is perpendicular to the first pivot axis.

15. Article breaking apparatus according to claim 11, in which an actuating means is provided to pivot the apparatus about the third pivot axis.

16. Article breaking apparatus according to claim 15, in which said actuating means comprises a rotary actuator.

17. Article breaking apparatus according to claim 1, in which the first article supporting surface is arranged to support an article with its longitudinal axis transverse to the jaws and at an angle relative to the direction of motion of the jaws.

18. Article breaking apparatus according to claim 17, in which the angle is between 45° and 75°.

19. Article breaking apparatus according to claim 18, in which the angle is between 56° and 66°.

20. Article breaking apparatus according to claim 19, in which the angle is 61°.

21. Article breaking apparatus according to claim 17, in which the first article supporting surface includes a first article engaging edge and a second article engaging edge spaced from the first article engaging edge, the said edges engageable with the article to be broken.

22. Article breaking apparatus according to claim 21, in which the first edge is nearer than the second edge to the article engaging surface of the second jaw in the direction of motion of the jaws.

23. Article breaking apparatus according to claim 21, in which the first edge is nearer than the second edge to the article engaging surface of the second jaw in a direction lateral to the direction of motion of the jaws.

24. Article breaking apparatus according to claim 21, in which the first edge is cooperable with the article engaging surface of the second jaw.

25. Article breaking apparatus according to claim 21, in which the plane of motion of the article engaging surface of the second jaw lies between the said edges.

26. An article breaking apparatus, comprising:
   (a) a first member having a first jaw on an end thereof, the first member including a first pivot means and a fixing means remote from the first jaw permitting mounting of the apparatus on the arm of a suitable vehicle, the first jaw having a first article supporting surface;
   (b) a second member pivotally mounted on the first pivot means about a first pivot axis and having a second jaw cooperable with the first jaw, the second jaw having an article engaging surface and being movable about the first pivot axis relative to the first jaw between an article receiving position in which the first article supporting surface and the article engaging surface diverge away from the first pivot axis, whereby, as the second jaw moves from the receiving position to the breaking position, an article located between the jaws will be urged along the first article supporting surface towards the first pivot axis by the movement of the second jaw against the article relative to the first jaw, said apparatus further including means for moving said jaws between the receiving and breaking positions;
   (c) a moving means for moving said jaws between the receiving and breaking positions comprising;
      (i) a piston and cylinder assembly driven by an hydraulic compressor of the vehicle to which the apparatus is attached in use;
      (ii) the cylinder of the piston and cylinder assembly is pivotally mounted on the first member, and the piston is pivotally connected at its end about a second pivot axis to the second member; and
      (iii) the piston of the piston and cylinder assembly is connected to a slot or slots in the second member, and the piston includes a pin extending through and slidably mounted in the slot or slots; and
   (d) the apparatus is arranged such that initially the pin moves towards the first pivot axis, and subsequently away from said axis, as the second jaw moves from the receiving position to the article breaking position.

* * * * *